(12) United States Patent
Yang et al.

(10) Patent No.: US 10,277,464 B2
(45) Date of Patent: Apr. 30, 2019

(54) CLIENT AUTO-CONFIGURATION IN A MULTI-SWITCH LINK AGGREGATION

(71) Applicant: ARRIS Enterprises LLC, Suwanee, GA (US)

(72) Inventors: Mei Yang, Fremont, CA (US); Ravindran Suresh, Santa Clara, CA (US); Arijit Bhattacharyya, San Jose, CA (US); Maocheng Hu, Union City, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 13/786,328

(22) Filed: Mar. 5, 2013

(65) Prior Publication Data

US 2013/0315097 A1 Nov. 28, 2013

Related U.S. Application Data

(60) Provisional application No. 61/650,360, filed on May 22, 2012.

(51) Int. Cl.
H04L 12/24 (2006.01)

(52) U.S. Cl.
CPC ...... *H04L 41/0886* (2013.01); *H04L 41/0893* (2013.01); *Y02D 30/30* (2018.01); *Y02D 30/32* (2018.01)

(58) Field of Classification Search
CPC ..... H04L 41/0886; H04L 12/00; H04L 41/08; H04L 41/0893; H04L 41/0896;
(Continued)

(56) References Cited

U.S. PATENT DOCUMENTS

| 829,529 A | 8/1906 | Keathley |
| 2,854,352 A | 9/1958 | Gronemeyer |

(Continued)

FOREIGN PATENT DOCUMENTS

| CN | 1735062 | 2/2006 |
| CN | 1777149 | 5/2006 |

(Continued)

OTHER PUBLICATIONS

IEEE Computer Society, IEEE Standard for Local and metropolitan area networks—Station and Media Access Control Connectivity Discovery, IEEE Standard 802.1AB-2009, pp. 25-34.*

(Continued)

*Primary Examiner* — Un C Cho
*Assistant Examiner* — Shah M Rahman
(74) *Attorney, Agent, or Firm* — Stewart M. Wiener

(57) ABSTRACT

One embodiment of the present invention provides a switch capable of auto-configuration of client devices for a link aggregation. The switch includes a packet processor, an auto-configuration module, and a link-aggregation management module. During operation, the packet processor extracts an identifier of a client device from a notification message received via a local port. The auto-configuration module, which is coupled to the packet processor, associates the local port with the identifier of the client device. If the packet processor recognizes the identifier of the client device in a message received from a remote switch, the link-aggregation management module forms a multi-switch link aggregation for the client device in conjunction with the remote switch.

24 Claims, 6 Drawing Sheets

(58) Field of Classification Search
CPC ......... Y02B 60/43; Y02B 60/44; H04J 14/00;
Y02D 30/30; Y02D 30/32
USPC ....... 370/216, 217, 218, 241, 242, 244, 250,
370/254, 389, 392, 400, 401, 467, 480
See application file for complete search history.

(56) References Cited

U.S. PATENT DOCUMENTS

| | | |
|---|---|---|
| 5,390,173 A | 2/1995 | Spinney |
| 5,802,278 A | 9/1998 | Isfeld |
| 5,878,232 A | 3/1999 | Marimuthu |
| 5,879,173 A | 3/1999 | Poplawski |
| 5,959,968 A | 9/1999 | Chin |
| 5,973,278 A | 10/1999 | Wehrill, III |
| 5,983,278 A | 11/1999 | Chong |
| 5,995,262 A | 11/1999 | Hirota |
| 6,041,042 A | 3/2000 | Bussiere |
| 6,085,238 A | 7/2000 | Yuasa |
| 6,092,062 A | 7/2000 | Lohman |
| 6,104,696 A | 8/2000 | Kadambi |
| 6,185,214 B1 | 2/2001 | Schwartz |
| 6,185,241 B1 | 2/2001 | Sun |
| 6,295,527 B1 | 9/2001 | McCormack |
| 6,331,983 B1 | 12/2001 | Haggerty |
| 6,438,106 B1 | 8/2002 | Pillar |
| 6,498,781 B1 | 12/2002 | Bass |
| 6,542,266 B1 | 4/2003 | Phillips |
| 6,553,029 B1 * | 4/2003 | Alexander ............ H04L 49/351 370/389 |
| 6,571,355 B1 | 5/2003 | Linnell |
| 6,583,902 B1 | 6/2003 | Yuen |
| 6,633,761 B1 | 10/2003 | Singhal |
| 6,636,963 B1 | 10/2003 | Stein |
| 6,771,610 B1 | 8/2004 | Seaman |
| 6,870,840 B1 | 3/2005 | Hill |
| 6,873,602 B1 | 3/2005 | Ambe |
| 6,910,149 B2 * | 6/2005 | Perloff et al. ................. 714/4.3 |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,061,877 B1 | 6/2006 | Gummalla |
| 7,062,177 B1 | 6/2006 | Grivna |
| 7,097,308 B2 | 8/2006 | Kim et al. |
| 7,173,934 B2 | 2/2007 | Lapuh |
| 7,197,308 B2 | 3/2007 | Signhal |
| 7,206,288 B2 | 4/2007 | Cometto |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,397,768 B1 | 7/2008 | Betker |
| 7,397,794 B1 | 7/2008 | Lacroute |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser, Jr. |
| 7,571,447 B2 | 8/2009 | Ally |
| 7,559,990 B2 | 10/2009 | Mital |
| 7,599,901 B2 | 10/2009 | Mital |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,801,021 B1 | 9/2010 | Triantafillis |
| 7,808,992 B2 | 10/2010 | Homchaudhuri |
| 7,836,332 B2 | 11/2010 | Hara |
| 7,843,906 B1 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,912,091 B1 | 3/2011 | Krishnan |
| 7,924,837 B1 | 4/2011 | Shabtay |
| 7,937,438 B1 | 5/2011 | Miller |
| 7,937,756 B2 | 5/2011 | Kay |
| 7,945,941 B2 | 5/2011 | Sinha |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,090,805 B1 | 1/2012 | Chawla |
| 8,102,781 B2 | 1/2012 | Smith |
| 8,102,791 B2 | 1/2012 | Tang |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,175,107 B1 | 5/2012 | Yalagandula |
| 8,095,774 B1 | 6/2012 | Lambeth |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,124,906 B2 | 8/2012 | Raman |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake, III |
| 8,369,335 B2 | 2/2013 | Jha |
| 8,369,347 B2 | 2/2013 | Xiong |
| 8,392,496 B2 | 3/2013 | Linden |
| 8,451,717 B2 | 5/2013 | Srikrishnan |
| 8,462,774 B2 | 6/2013 | Page |
| 8,465,774 B2 | 6/2013 | Page |
| 8,467,375 B2 | 6/2013 | Blair |
| 8,520,595 B2 | 8/2013 | Yadav |
| 8,553,710 B1 | 10/2013 | White |
| 8,599,850 B2 | 12/2013 | Ha |
| 8,599,864 B2 | 12/2013 | Chung |
| 8,615,008 B2 | 12/2013 | Natarajan |
| 8,619,788 B1 | 12/2013 | Sankaran |
| 8,705,526 B1 | 4/2014 | Hasan |
| 8,706,905 B1 | 4/2014 | McGlaughlin |
| 8,717,895 B2 | 5/2014 | Koponen |
| 8,724,456 B1 | 5/2014 | Hong |
| 8,792,501 B1 | 7/2014 | Rustagi |
| 8,798,045 B1 | 8/2014 | Aybay |
| 8,798,055 B1 | 8/2014 | An |
| 8,804,736 B1 | 8/2014 | Drake |
| 8,806,031 B1 | 8/2014 | Kondur |
| 8,826,385 B2 | 9/2014 | Congdon |
| 8,918,631 B1 | 12/2014 | Kumar |
| 8,937,865 B1 | 1/2015 | Kumar |
| 8,948,181 B2 | 2/2015 | Kapadia |
| 8,995,272 B2 | 3/2015 | Agarwal |
| 9,178,793 B1 | 11/2015 | Marlow |
| 9,350,680 B2 | 5/2016 | Thayalan |
| 9,401,818 B2 | 7/2016 | Venkatesh |
| 9,438,447 B2 | 9/2016 | Basso |

(56) References Cited

U.S. PATENT DOCUMENTS

| | | |
|---|---|---|
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0027885 A1 | 3/2002 | Ben-Ami |
| 2002/0039350 A1 | 4/2002 | Wang |
| 2002/0054593 A1 | 5/2002 | Morohashi |
| 2002/0087723 A1 | 7/2002 | Williams |
| 2002/0091795 A1 | 7/2002 | Yip |
| 2003/0026290 A1 | 2/2003 | Umayabashi |
| 2003/0041085 A1 | 2/2003 | Sato |
| 2003/0093567 A1 | 5/2003 | Lolayekar |
| 2003/0097464 A1 | 5/2003 | Martinez |
| 2003/0097470 A1* | 5/2003 | Lapuh .................. H04L 45/245 709/239 |
| 2003/0123393 A1 | 7/2003 | Feuerstraeter |
| 2003/0147385 A1 | 8/2003 | Montalvo |
| 2003/0152075 A1 | 8/2003 | Hawthorne |
| 2003/0174706 A1 | 9/2003 | Shankar |
| 2003/0189905 A1 | 10/2003 | Lee |
| 2003/0189930 A1 | 10/2003 | Terrell |
| 2003/0208616 A1 | 11/2003 | Laing |
| 2003/0216143 A1 | 11/2003 | Roese |
| 2003/0223428 A1 | 12/2003 | BlanquerGonzalez |
| 2003/0233534 A1 | 12/2003 | Bernhard |
| 2004/0001433 A1 | 1/2004 | Gram |
| 2004/0003094 A1 | 1/2004 | See |
| 2004/0010600 A1 | 1/2004 | Baldwin |
| 2004/0088668 A1 | 1/2004 | Bornowski |
| 2004/0049699 A1 | 3/2004 | Griffith |
| 2004/0057430 A1 | 3/2004 | Paavolainen |
| 2004/0081171 A1 | 4/2004 | Finn |
| 2004/0095900 A1 | 5/2004 | Siegel |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2004/0225725 A1 | 11/2004 | Enomoto |
| 2004/0243673 A1 | 12/2004 | Goyal |
| 2005/0007951 A1 | 1/2005 | Lapuh |
| 2005/0025179 A1 | 2/2005 | McLaggan |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0111352 A1 | 5/2005 | Ho |
| 2005/0122979 A1 | 6/2005 | Gross |
| 2005/0152335 A1 | 7/2005 | Lodha |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1 | 11/2005 | Hafid |
| 2005/0265330 A1 | 12/2005 | Suzuki |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima et al. |
| 2006/0029055 A1 | 2/2006 | Perera |
| 2006/0034292 A1 | 2/2006 | Wakayama |
| 2006/0036648 A1 | 2/2006 | Frey |
| 2006/0036765 A1 | 2/2006 | Weyman |
| 2006/0039366 A1 | 2/2006 | Ghosh |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0092860 A1 | 5/2006 | Higashitaniguchi |
| 2006/0093254 A1 | 5/2006 | Mozdy |
| 2006/0098589 A1 | 5/2006 | Kreeger |
| 2006/0126511 A1 | 6/2006 | Youn |
| 2006/0140130 A1 | 6/2006 | Kalkunte |
| 2006/0155828 A1 | 7/2006 | Ikeda |
| 2006/0168109 A1 | 7/2006 | Warmenhoven |
| 2006/0184937 A1 | 8/2006 | Abels |
| 2006/0209886 A1 | 9/2006 | Silberman |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | Desanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2006/0294413 A1 | 12/2006 | Filz |
| 2007/0036178 A1 | 2/2007 | Hares |
| 2007/0053294 A1 | 3/2007 | Ho |
| 2007/0061817 A1 | 3/2007 | Atkinson |
| 2007/0074052 A1 | 3/2007 | Hemmah |
| 2007/0081530 A1 | 4/2007 | Nomura |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |
| 2007/0116422 A1 | 5/2007 | Burke |
| 2007/0121617 A1 | 5/2007 | Kanekar |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0206762 A1 | 9/2007 | Chandra |
| 2007/0211712 A1 | 9/2007 | Fitch |
| 2007/0220059 A1 | 9/2007 | Lu |
| 2007/0226214 A1 | 9/2007 | Smits |
| 2007/0230472 A1 | 10/2007 | Jesuraj |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0289017 A1 | 12/2007 | Copeland, III |
| 2008/0052487 A1 | 2/2008 | Akahane |
| 2008/0056135 A1 | 3/2008 | Lee |
| 2008/0056300 A1 | 3/2008 | Williams |
| 2008/0057918 A1 | 3/2008 | Abrant |
| 2008/0065760 A1 | 3/2008 | Damm |
| 2008/0080517 A1 | 4/2008 | Roy |
| 2008/0095160 A1 | 4/2008 | Yadav |
| 2008/0101386 A1 | 5/2008 | Gray |
| 2008/0112133 A1 | 5/2008 | Torudbakken |
| 2008/0112400 A1 | 5/2008 | Dunbar et al. |
| 2008/0133760 A1 | 6/2008 | Henricus |
| 2008/0159260 A1 | 7/2008 | Vobbilisetty |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186968 A1 | 8/2008 | Farinacci |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0267179 A1 | 10/2008 | Lavigne |
| 2008/0285458 A1 | 11/2008 | Lysne |
| 2008/0285555 A1 | 11/2008 | Ogasahara |
| 2008/0288020 A1 | 11/2008 | Einav |

(56) References Cited

U.S. PATENT DOCUMENTS

| | | | |
|---|---|---|---|
| 2008/0298248 A1 | 12/2008 | Roeck | |
| 2008/0304428 A1* | 12/2008 | Stilling | H04L 12/462 370/256 |
| 2008/0304498 A1 | 12/2008 | Jorgensen | |
| 2008/0304519 A1 | 12/2008 | Koenen | |
| 2008/0310342 A1 | 12/2008 | Kruys | |
| 2009/0022069 A1 | 1/2009 | Khan | |
| 2009/0024734 A1 | 1/2009 | Merbach | |
| 2009/0037607 A1 | 2/2009 | Farinacci | |
| 2009/0037977 A1 | 2/2009 | Gai | |
| 2009/0041046 A1 | 2/2009 | Hirata | |
| 2009/0042270 A1 | 2/2009 | Dolly | |
| 2009/0044270 A1 | 2/2009 | Shelly | |
| 2009/0067422 A1 | 3/2009 | Poppe | |
| 2009/0067442 A1 | 3/2009 | Killian | |
| 2009/0079560 A1 | 3/2009 | Fries | |
| 2009/0080345 A1 | 3/2009 | Gray | |
| 2009/0083445 A1 | 3/2009 | Ganga | |
| 2009/0092042 A1 | 4/2009 | Yuhara | |
| 2009/0092043 A1 | 4/2009 | Lapuh | |
| 2009/0094354 A1 | 4/2009 | Rastogi | |
| 2009/0106298 A1 | 4/2009 | Furusho | |
| 2009/0106405 A1 | 4/2009 | Mazarick | |
| 2009/0113408 A1 | 4/2009 | Toeroe | |
| 2009/0116381 A1 | 5/2009 | Kanda | |
| 2009/0122700 A1 | 5/2009 | Aboba | |
| 2009/0129384 A1 | 5/2009 | Regan | |
| 2009/0138577 A1 | 5/2009 | Casado | |
| 2009/0138752 A1 | 5/2009 | Graham | |
| 2009/0144720 A1 | 6/2009 | Roush | |
| 2009/0161584 A1 | 6/2009 | Guan | |
| 2009/0161670 A1 | 6/2009 | Shepherd | |
| 2009/0168647 A1 | 7/2009 | Holness | |
| 2009/0199177 A1 | 8/2009 | Edwards | |
| 2009/0204965 A1 | 8/2009 | Tanaka | |
| 2009/0213783 A1 | 8/2009 | Moreton | |
| 2009/0222879 A1 | 9/2009 | Kostal | |
| 2009/0225752 A1 | 9/2009 | Mitsumori | |
| 2009/0232031 A1 | 9/2009 | Vasseur | |
| 2009/0245112 A1 | 10/2009 | Okazaki | |
| 2009/0245137 A1 | 10/2009 | Hares | |
| 2009/0245242 A1 | 10/2009 | Carlson | |
| 2009/0246137 A1 | 10/2009 | Hadida | |
| 2009/0249444 A1 | 10/2009 | Macauley | |
| 2009/0252049 A1 | 10/2009 | Ludwig | |
| 2009/0252061 A1 | 10/2009 | Small | |
| 2009/0252503 A1 | 10/2009 | Ishigami | |
| 2009/0260083 A1 | 10/2009 | Szeto | |
| 2009/0279558 A1 | 11/2009 | Davis | |
| 2009/0292858 A1 | 11/2009 | Lambeth | |
| 2009/0316721 A1 | 12/2009 | Kanda | |
| 2009/0323698 A1 | 12/2009 | LeFaucheur | |
| 2009/0323708 A1 | 12/2009 | Ihle | |
| 2009/0327392 A1 | 12/2009 | Tripathi | |
| 2009/0327462 A1 | 12/2009 | Adams | |
| 2010/0002382 A1 | 1/2010 | Aybay | |
| 2010/0027420 A1 | 2/2010 | Smith | |
| 2010/0042869 A1 | 2/2010 | Szabo | |
| 2010/0046471 A1 | 2/2010 | Hattori | |
| 2010/0054260 A1 | 3/2010 | Pandey | |
| 2010/0061269 A1 | 3/2010 | Banerjee | |
| 2010/0074175 A1 | 3/2010 | Banks | |
| 2010/0085981 A1 | 4/2010 | Gupta | |
| 2010/0097941 A1 | 4/2010 | Carlson | |
| 2010/0103813 A1 | 4/2010 | Allan | |
| 2010/0103939 A1 | 4/2010 | Carlson | |
| 2010/0114818 A1 | 5/2010 | Lier | |
| 2010/0131636 A1 | 5/2010 | Suri | |
| 2010/0157844 A1* | 6/2010 | Casey | H04L 45/02 370/254 |
| 2010/0158024 A1 | 6/2010 | Sajassi | |
| 2010/0165877 A1 | 7/2010 | Shukla | |
| 2010/0165995 A1 | 7/2010 | Mehta | |
| 2010/0168467 A1 | 7/2010 | Johnston | |
| 2010/0169467 A1 | 7/2010 | Shukla | |
| 2010/0169948 A1 | 7/2010 | Budko | |
| 2010/0182920 A1 | 7/2010 | Matsuoka | |
| 2010/0189119 A1 | 7/2010 | Sawada | |
| 2010/0195489 A1 | 8/2010 | Zhou | |
| 2010/0195529 A1 | 8/2010 | Liu | |
| 2010/0215042 A1 | 8/2010 | Sato | |
| 2010/0215049 A1 | 8/2010 | Raza | |
| 2010/0220724 A1 | 9/2010 | Rabie | |
| 2010/0226368 A1 | 9/2010 | Mack-Crane | |
| 2010/0226381 A1 | 9/2010 | Mehta | |
| 2010/0246388 A1 | 9/2010 | Gupta | |
| 2010/0254703 A1 | 10/2010 | Kirkpatrick | |
| 2010/0257263 A1 | 10/2010 | Casado | |
| 2010/0258263 A1 | 10/2010 | Douxchamps | |
| 2010/0265849 A1 | 10/2010 | Harel | |
| 2010/0271960 A1 | 10/2010 | Krygowski | |
| 2010/0272107 A1 | 10/2010 | Papp | |
| 2010/0281106 A1 | 11/2010 | Ashwood-Smith | |
| 2010/0284414 A1 | 11/2010 | Agarwal | |
| 2010/0284418 A1 | 11/2010 | Gray | |
| 2010/0284698 A1 | 11/2010 | McColloch | |
| 2010/0287262 A1 | 11/2010 | Elzur | |
| 2010/0287548 A1 | 11/2010 | Zhou | |
| 2010/0290464 A1 | 11/2010 | Assarpour | |
| 2010/0290472 A1 | 11/2010 | Raman | |
| 2010/0290473 A1 | 11/2010 | Enduri | |
| 2010/0299527 A1 | 11/2010 | Arunan | |
| 2010/0303071 A1 | 12/2010 | Kotalwar | |
| 2010/0303075 A1 | 12/2010 | Tripathi | |
| 2010/0303083 A1 | 12/2010 | Belanger | |
| 2010/0309820 A1 | 12/2010 | Rajagopalan | |
| 2010/0309912 A1 | 12/2010 | Mehta | |
| 2010/0329110 A1 | 12/2010 | Rose | |
| 2010/0329265 A1 | 12/2010 | Lapuh | |
| 2011/0007738 A1 | 1/2011 | Berman | |
| 2011/0019678 A1 | 1/2011 | Mehta | |
| 2011/0032945 A1* | 2/2011 | Mullooly et al. | 370/401 |
| 2011/0035489 A1 | 2/2011 | McDaniel | |
| 2011/0035498 A1 | 2/2011 | Shah | |
| 2011/0044339 A1 | 2/2011 | Kotalwar | |
| 2011/0044352 A1 | 2/2011 | Chaitou | |
| 2011/0051723 A1 | 3/2011 | Rabie | |
| 2011/0058547 A1 | 3/2011 | Waldrop | |
| 2011/0064086 A1 | 3/2011 | Xiong | |
| 2011/0064089 A1 | 3/2011 | Hidaka | |
| 2011/0072208 A1 | 3/2011 | Gulati | |
| 2011/0085560 A1 | 4/2011 | Chawla | |
| 2011/0085562 A1 | 4/2011 | Bao | |
| 2011/0085563 A1 | 4/2011 | Kotha | |
| 2011/0088011 A1 | 4/2011 | Ouali | |
| 2011/0110266 A1 | 5/2011 | Li | |
| 2011/0134802 A1 | 6/2011 | Rajagopalan | |
| 2011/0134803 A1 | 6/2011 | Dalvi | |
| 2011/0134925 A1 | 6/2011 | Safrai | |
| 2011/0142053 A1 | 6/2011 | Van Der Merwe | |
| 2011/0142062 A1 | 6/2011 | Wang | |
| 2011/0149526 A1 | 6/2011 | Turner | |
| 2011/0158113 A1 | 6/2011 | Nanda | |
| 2011/0161494 A1 | 6/2011 | McDysan | |
| 2011/0161695 A1 | 6/2011 | Okita | |
| 2011/0176412 A1 | 7/2011 | Stine | |
| 2011/0188373 A1 | 8/2011 | Saito | |
| 2011/0194403 A1 | 8/2011 | Sajassi | |
| 2011/0194563 A1 | 8/2011 | Shen | |
| 2011/0225540 A1 | 9/2011 | d'Entremont | |
| 2011/0228767 A1* | 9/2011 | Singla | H04L 49/00 370/389 |
| 2011/0228780 A1 | 9/2011 | Ashwood-Smith | |
| 2011/0231570 A1 | 9/2011 | Altekar | |
| 2011/0231574 A1 | 9/2011 | Saunderson | |
| 2011/0235523 A1 | 9/2011 | Jha | |
| 2011/0243133 A9 | 10/2011 | Villait | |
| 2011/0243136 A1 | 10/2011 | Raman | |
| 2011/0246669 A1 | 10/2011 | Kanada | |
| 2011/0255538 A1 | 10/2011 | Srinivasan | |
| 2011/0255540 A1 | 10/2011 | Mizrahi | |
| 2011/0261828 A1 | 10/2011 | Smith | |
| 2011/0268118 A1 | 11/2011 | Schlansker | |
| 2011/0268120 A1 | 11/2011 | Vobbilisetty | |

(56) References Cited

U.S. PATENT DOCUMENTS

| | | |
|---|---|---|
| 2011/0268125 A1 | 11/2011 | Vobbilisetty |
| 2011/0273988 A1 | 11/2011 | Tourrilhes |
| 2011/0273990 A1 | 11/2011 | Rajagopalan |
| 2011/0274114 A1 | 11/2011 | Dhar |
| 2011/0280572 A1* | 11/2011 | Vobbilisetty et al. .......... 398/45 |
| 2011/0286357 A1 | 11/2011 | Haris |
| 2011/0286457 A1 | 11/2011 | Ee |
| 2011/0286462 A1 | 11/2011 | Kompella |
| 2011/0055274 A1 | 12/2011 | Hegge |
| 2011/0292947 A1 | 12/2011 | Vobbilisetty |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob Da Silva |
| 2012/0033668 A1 | 2/2012 | Humphries |
| 2012/0033669 A1 | 2/2012 | Mohandas |
| 2012/0033672 A1 | 2/2012 | Page |
| 2012/0039163 A1 | 2/2012 | Nakajima |
| 2012/0042095 A1* | 2/2012 | Kotha .................... H04L 12/56 709/233 |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0099863 A1 | 4/2012 | Xu |
| 2012/0102160 A1 | 4/2012 | Breh |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0136999 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0170491 A1 | 7/2012 | Kern |
| 2012/0173905 A1* | 7/2012 | Diab .................... H04L 12/66 713/320 |
| 2012/0177039 A1 | 7/2012 | Berman |
| 2012/0210416 A1 | 8/2012 | Mihelich |
| 2012/0221636 A1 | 8/2012 | Surtani |
| 2012/0230225 A1 | 9/2012 | Matthews |
| 2012/0239918 A1 | 9/2012 | Huang |
| 2012/0243359 A1 | 9/2012 | Keesara |
| 2012/0243539 A1 | 9/2012 | Keesara |
| 2012/0250502 A1 | 10/2012 | Brolin |
| 2012/0260079 A1 | 10/2012 | Mruthyunjaya |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0287785 A1 | 11/2012 | Kamble |
| 2012/0294192 A1 | 11/2012 | Masood |
| 2012/0294194 A1 | 11/2012 | Balasubramanian |
| 2012/0230800 A1 | 12/2012 | Kamble |
| 2012/0320800 A1* | 12/2012 | Kamble et al. ............... 370/255 |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003549 A1 | 1/2013 | Matthews |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0034094 A1 | 2/2013 | Cardona |
| 2013/0058354 A1 | 3/2013 | Casado |
| 2013/0066947 A1 | 3/2013 | Ahmad |
| 2013/0067466 A1 | 3/2013 | Combs |
| 2013/0070762 A1 | 3/2013 | Adams |
| 2013/0083693 A1 | 4/2013 | Himura |
| 2013/0097345 A1 | 4/2013 | Munoz |
| 2013/0114595 A1 | 5/2013 | Mack-Crane et al. |
| 2013/0124707 A1 | 5/2013 | Ananthapadmanabha |
| 2013/0127848 A1 | 5/2013 | Joshi |
| 2013/0132296 A1 | 5/2013 | Manfred |
| 2013/0135811 A1 | 5/2013 | Dunwoody |
| 2013/0136123 A1 | 5/2013 | Ge |
| 2013/0148546 A1 | 6/2013 | Eisenhauer |
| 2013/0156425 A1 | 6/2013 | Kirkpatrick |
| 2013/0194914 A1 | 8/2013 | Agarwal |
| 2013/0219473 A1 | 8/2013 | Schaefer |
| 2013/0223221 A1 | 8/2013 | Xu |
| 2013/0223449 A1 | 8/2013 | Koganti |
| 2013/0235881 A1* | 9/2013 | Sharma ..................... 370/419 |
| 2013/0250951 A1 | 9/2013 | Koganti |
| 2013/0250958 A1 | 9/2013 | Watanabe |
| 2013/0259037 A1 | 10/2013 | Natarajan |
| 2013/0266015 A1 | 10/2013 | Qu |
| 2013/0268590 A1* | 10/2013 | Mahadevan ........ H04L 41/0672 709/204 |
| 2013/0272135 A1 | 10/2013 | Leong |
| 2013/0294451 A1 | 11/2013 | Li |
| 2013/0297757 A1 | 11/2013 | Han |
| 2013/0301425 A1 | 11/2013 | Chandra |
| 2013/0301642 A1 | 11/2013 | Radhakrishnan |
| 2013/0308492 A1 | 11/2013 | Baphna |
| 2013/0308647 A1 | 11/2013 | Rosset |
| 2013/0315125 A1 | 11/2013 | Ravishankar |
| 2013/0315586 A1 | 11/2013 | Kipp |
| 2013/0322427 A1 | 12/2013 | Stiekes |
| 2013/0332660 A1 | 12/2013 | Talagala |
| 2013/0336104 A1 | 12/2013 | Talla |
| 2013/0346583 A1 | 12/2013 | Low |
| 2014/0013324 A1 | 1/2014 | Zhang |
| 2014/0019608 A1 | 1/2014 | Kawakami |
| 2014/0025736 A1 | 1/2014 | Wang |
| 2014/0044126 A1 | 2/2014 | Sabhanatarajan |
| 2014/0050223 A1 | 2/2014 | Foo |
| 2014/0056298 A1 | 2/2014 | Vobbilisetty |
| 2014/0059225 A1 | 2/2014 | Gasparakis |
| 2014/0064056 A1 | 3/2014 | Sakata |
| 2014/0086253 A1 | 3/2014 | Yong |
| 2014/0105034 A1 | 4/2014 | Huawei |
| 2014/0112122 A1 | 4/2014 | Kapadia |
| 2014/0140243 A1 | 5/2014 | Ashwood-Smith |
| 2014/0157251 A1 | 6/2014 | Hocker |
| 2014/0241147 A1 | 8/2014 | Rajagopalan |
| 2014/0258446 A1 | 9/2014 | Bursell |
| 2014/0269720 A1 | 9/2014 | Srinivasan |
| 2014/0269733 A1 | 9/2014 | Venkatesh |
| 2014/0298091 A1 | 10/2014 | Carlen |
| 2014/0355477 A1 | 12/2014 | Moopath |
| 2015/0009992 A1 | 1/2015 | Zhang |
| 2015/0010007 A1 | 1/2015 | Matsuhira |
| 2015/0030031 A1 | 1/2015 | Zhou |
| 2015/0110111 A1 | 4/2015 | Song |
| 2015/0110487 A1 | 4/2015 | Fenkes |
| 2015/0127618 A1 | 5/2015 | Alberti |
| 2015/0143369 A1 | 5/2015 | Zheng |
| 2015/0172098 A1 | 6/2015 | Agarwal |
| 2015/0188753 A1 | 7/2015 | Anumala |
| 2015/0195093 A1 | 7/2015 | Ramasubramani |
| 2015/0222506 A1 | 8/2015 | Kizhakkiniyil |
| 2015/0248298 A1 | 9/2015 | Gavrilov |
| 2015/0263991 A1 | 9/2015 | MacChiano |
| 2015/0281066 A1 | 10/2015 | Koley |

(56) References Cited

U.S. PATENT DOCUMENTS

| | | | |
|---|---|---|---|
| 2015/0301901 A1 | 10/2015 | Rath | |
| 2015/0347468 A1 | 12/2015 | Bester | |
| 2016/0072899 A1 | 3/2016 | Tung | |
| 2017/0026197 A1 | 1/2017 | Venkatesh | |

FOREIGN PATENT DOCUMENTS

| | | |
|---|---|---|
| CN | 101064682 | 10/2007 |
| CN | 101459618 | 6/2009 |
| CN | 101471899 | 7/2009 |
| CN | 101548511 | 9/2009 |
| CN | 101645880 | 2/2010 |
| CN | 102098237 | 6/2011 |
| CN | 102148749 | 8/2011 |
| CN | 102301663 | 12/2011 |
| CN | 102349268 | 2/2012 |
| CN | 102378176 | 3/2012 |
| CN | 102404181 | 4/2012 |
| CN | 102415065 | 4/2012 |
| CN | 102415065 A | 4/2012 |
| CN | 102801599 | 11/2012 |
| CN | 102801599 A | 11/2012 |
| CN | 102088388 | 4/2014 |
| EP | 0579567 | 5/1993 |
| EP | 0579567 A2 | 1/1994 |
| EP | 0993156 | 4/2000 |
| EP | 0993156 A2 | 12/2000 |
| EP | 1398920 | 3/2004 |
| EP | 1398920 A2 | 3/2004 |
| EP | 1916807 A2 | 4/2008 |
| EP | 2001167 A1 | 12/2008 |
| EP | 2854352 | 4/2015 |
| EP | 2874359 | 5/2015 |
| WO | 2008056838 | 5/2008 |
| WO | 2009042919 | 4/2009 |
| WO | 2010111142 | 9/2010 |
| WO | 2010111142 A1 | 9/2010 |
| WO | 2011132568 | 10/2011 |
| WO | 2011140028 | 11/2011 |
| WO | 2011140028 A1 | 11/2011 |
| WO | 2012033663 | 3/2012 |
| WO | 2012093429 | 7/2012 |
| WO | 2014031781 | 2/2014 |

OTHER PUBLICATIONS

IEEE Computer Society, IEEE Standard for Local and metropolitan area networks—Link Aggregation, IEEE Standard 802.1AX-2008, pp. 7-78.*

IEEE et al., "Amendment to Carrier Sense Multiple Access with Collision Detection (CSMA/CD) Access Method and Physical Layer Specifications—Aggregation of Multiple Link Segments", Mar. 30, 2000, IEEE Computer Society, IEEE Std 802.3ad-2000, pp. 116-117.*

"Switched Virtual Internetworking moved beyond bridges and routers", 8178 Data Communications Sep. 23, 1994, No. 12, New York.

S. Night et al., "Virtual Router Redundancy Protocol", Network Working Group, XP-002135272, Apr. 1998.

Eastlake 3rd., Donald et al., "RBridges: TRILL Header Options", Draft-ietf-trill-rbridge-options-00.txt, Dec. 24, 2009.

J. Touch, et al., "Transparent Interconnection of Lots of Links (TRILL): Problem and Applicability Statement", May 2009.

Perlman, Radia et al., "RBridge VLAN Mapping", Draft-ietf-trill-rbridge-vlan-mapping-01.txt, Dec. 4, 2009.

Brocade Fabric OS (FOS) 6.2 Virtual Fabrics Feature Frequently Asked Questions.

Perlman, Radia "Challenges and Opportunities in the Design of TRILL: a Routed layer 2 Technology", XP-002649647, 2009.

Nadas, S. et al., "Virtual Router Redundancy Protocol (VRRP) Version 3 for IPv4 and IPv6", Mar. 2010.

Perlman, Radia et al., "RBridges: Base Protocol Specification", draft-ietf-trill-rbridge-protocol-16.txt, Mar. 3, 2010.

Christensen, M. et al., "Considerations for Internet Group Management Protocol (IGMP) and Multicast Listener Discovery (MLD) Snooping Switches", May 2006.

Lapuh, Roger et al., "Split Multi-link Trunking (SMLT)", Oct. 2002.

Lapuh, Roger et al., "Split Multi-link Trunking (SMLT) draft-lapuh-network-smlt-08", 2008.

Office Action dated Jun. 18, 215, U.S. Appl. No. 13/098,490, filed May 2, 2011.

Office Action dated Jun. 16, 2015, U.S. Appl. No. 13/048,817, filed Mar. 15, 2011.

Touch, J. et al., 'Transparent Interconnection of Lots of Links (TRILL): Problem and Applicability Statement', May 2009, Network Working Group, pp. 1-17.

Zhai F. Hu et al. 'RBridge: Pseudo-Nickname; draft-hu-trill-pseudonode-nickname-02.txt', May 15, 2012.

Office Action dated Jul. 31, 2015, U.S. Appl. No. 13/598,204, filed Aug. 29, 2014.

Office Action dated Jul. 31, 2015, U.S. Appl. No. 14/473,941, filed Aug. 29, 2014.

Office Action dated Jul. 31, 2015, U.S. Appl. No. 14/488,173, filed Sep. 16, 2014.

Office Action dated Aug. 21, 2015, U.S. Appl. No. 13/776,217, filed Feb. 25, 2013.

Office Action dated Aug. 19, 2015, U.S. Appl. No. 14/156,374, filed Jan. 15, 2014.

Office Action dated Sep. 2, 2015, U.S. Appl. No. 14/151,693, filed Jan. 9, 2014.

Office Action dated Sep. 17, 2015, U.S. Appl. No. 14/577,785, filed Dec. 19, 2014.

Office Action dated Sep. 22, 2015 U.S. Appl. No. 13/656,438, filed Oct. 19, 2012.

Office Action dated Nov. 5, 2015, U.S. Appl. No. 14/178,042, filed Feb. 11, 2014.

Office Action dated Oct. 19, 2015, U.S. Appl. No. 14/215,996, filed Mar. 17, 2014.

Office Action dated Sep. 18, 2015, U.S. Appl. No. 13/345,566, filed Jan. 6, 2012.

'An Introduction to Brocade VCS Fabric Technology', BROCADE white paper, http://community.brocade.com/docs/DOC-2954, Dec. 3, 2012.

'RBridges: Base Protocol Specification', IETF Draft, Perlman et al., Jun. 26, 2009.

U.S. Appl. No. 13/030,806 Office Action dated Dec. 3, 2012.

Office action dated Apr. 26, 2012, U.S. Appl. No. 12/725,249, filed Mar. 16, 2010.

Office action dated Sep. 12, 2012, U.S. Appl. No. 12/725,249, filed Mar. 16, 2010.

Office action dated Dec. 21, 2012, U.S. Appl. No. 13/098,490, filed May 2, 2011.

Office action dated Mar. 27, 2014, U.S. Appl. No. 13/098,490, filed May 2, 2011.

Office action dated Jul. 9, 2013, U.S. Appl. No. 13/098,490, filed May 2, 2011.

Office action dated May 22, 2013, U.S. Appl. No. 13/087,239, filed Apr. 14, 2011.

Office action dated Dec. 5, 2012, U.S. Appl. No. 13/087,239, filed Apr. 14, 2011.

Office action dated Apr. 9, 2014, U.S. Appl. No. 13/092,724, filed Apr. 22, 2011.

Office action dated Feb. 5, 2013, U.S. Appl. No. 13/092,724, filed Apr. 22, 2011.

Office action dated Jan. 10, 2014, U.S. Appl. No. 13/092,580, filed Apr. 22, 2011.

Office action dated Jun. 10, 2013, U.S. Appl. No. 13/092,580, filed Apr. 22, 2011.

Office action dated Jan. 16, 2014, U.S. Appl. No. 13/042,259, filed Mar. 7, 2011.

Office action dated Mar. 18, 2013, U.S. Appl. No. 13/042,259, filed Mar. 7, 2011.

Office action dated Jul. 31, 2013, U.S. Appl. No. 13/042,259, filed Mar. 7, 2011.

(56) References Cited

OTHER PUBLICATIONS

Office action dated Aug. 29, 2014, U.S. Appl. No. 13/042,259, filed Mar. 7, 2011.
Office action dated Mar. 14, 2014, U.S. Appl. No. 13/092,460, filed Apr. 22, 2011.
Office action dated Jun. 21, 2013, U.S. Appl. No. 13/092,460, filed Apr. 22, 2011.
Office action dated Aug. 14, 2014, U.S. Appl. No. 13/092,460, filed Apr. 22, 2011.
Office action dated Jan. 28, 2013, U.S. Appl. No. 13/092,701, filed Apr. 22, 2011.
Office Action dated Mar. 26, 2014, U.S. Appl. No. 13/092,701, filed Apr. 22, 2011.
Office action dated Jul. 3, 2013, U.S. Appl. No. 13/092,701, filed Apr. 22, 2011.
Office action dated Oct. 2, 2014, for U.S. Appl. No. 13/092,752, filed Apr. 22, 2011.
Office Action dated Apr. 9, 2014, U.S. Appl. No. 13/092,752, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Jan. 6, 2014, U.S. Appl. No. 13/092,877, filed Apr. 22, 2011.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Jul. 7, 2014, U.S. Appl. No. 13/044,326, filed Mar. 9, 2011.
Office action dated Oct. 2, 2013, U.S. Appl. No. 13/044,326, filed Mar. 9, 2011.
Office Action dated Dec. 19, 2014, for U.S. Appl. No. 13/044,326, filed Mar. 9, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated Dec. 2, 2013, U.S. Appl. No. 13/184,526, filed Jul. 16, 2011.
Office action dated May 22, 2013, U.S. Appl. No. 13/148,526, filed Jul. 16, 2011.
Office action dated Aug. 21, 2014, U.S. Appl. No. 13/184,526, filed Jul. 16, 2011.
Office action dated Nov. 29, 2013, U.S. Appl. No. 13/092,873, filed Apr. 22, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office Action dated Mar. 6, 2014, U.S. Appl. No. 13/425,238, filed Mar. 20, 2012.
Office action dated Nov. 12, 2013, U.S. Appl. No. 13/312,903, filed Dec. 6, 2011.
Office action dated Jun. 13, 2013, U.S. Appl. No. 13/312,903, filed Dec. 6, 2011.
Office Action dated Jun. 18, 2014, U.S. Appl. No. 13/440,861, filed Apr. 5, 2012.
Office Action dated Feb. 28, 2014, U.S. Appl. No. 13/351,513, filed Jan. 17, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.
Brocade, 'FastIron and TurboIron 24x Configuration Guide', Feb. 16, 2010.
Brocade, 'The Effortless Network: Hyperedge Technology for the Campus LAN' 2012.
Brocade 'An Introduction to Brocade VCS Fabric Technology', Dec. 3, 2012.
Brocade 'Brocade Unveils 'The Effortless Network'', http://newsroom.brocade.com/press-releases/brocade-unveils-the-effortless-network-nasdaq-brcd-0859535, 2012.
FastIron Configuration Guide Supporting Ironware Software Release 07.0.00, Dec. 18, 2009.
Foundary FastIron Configuration Guide, Software Release FSX 04.2.00b, Software Release FWS 04.3.00, Software Release FGS 05.0.00a, Sep. 2008.
Huang, Nen-Fu et al., 'An Effective Spanning Tree Algorithm for a Bridged LAN', Mar. 16, 1992.
Knight, 'Network Based IP VPN Architecture using Virtual Routers', May 2003.
Knight P et al: 'Layer 2 and 3 Virtual Private Networks: Taxonomy, Technology, and Standardization Efforts', IEEE Communications Magazine, IEEE Service Center, Pscataway, US, vol. 42, No. 6, Jun. 1, 2004 (Jun. 1, 2004), pp. 124-131, XP001198207, ISSN: 0163-6804. DOI: 10.1109/MCOM.2004.304248.
Kompella, Ed K. et al., 'Virtual Private LAN Service (VPLS) Using BGP for Auto-Discovery and Signaling' Jan. 2007.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT) draft-lapuh-network-smlt-08', Jan. 2009.
Louati, Wajdi et al., 'Network-based virtual personal overlay networks using programmable virtual routers', IEEE Communications Magazine, Jul. 2005.
Mckeown, Nick et al. "OpenFlow: Enabling Innovation in Campus Networks", Mar. 14, 2008, www.openflow.org/documents/openflow-wp-latest.pdf.
Narten, T. et al., 'Problem Statement: Overlays for Network Virtualization d raft-narten-n vo3-over l ay-problem-statement-01', Oct. 31, 2011.
Office Action for U.S. Appl. No. 13/030,688, filed Feb. 18, 2011, dated Jul. 17, 2014.
Office Action for U.S. Appl. No. 13/042,259, filed Mar. 7, 2011, dated Jan. 16, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.

(56) References Cited

OTHER PUBLICATIONS

Office Action for U.S. Appl. No. 13/092,752, filed Apr. 22, 2011, dated Jul. 18, 2013.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/365,993, filed Feb. 3, 2012, dated Jul. 23, 2013.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, dated Dec. 2, 2012.
Office Action for U.S. Appl. No. 12/725,249, filed Mar. 16, 2010, dated Apr. 26, 2013.
Office Action for U.S. Appl. No. 12/725,249, filed Mar. 16, 2010, dated Sep. 12, 2012.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/042,259, filed Mar. 7, 2011, dated Feb. 23, 2015.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/087,239, filed Apr. 14, 2011, dated May 22, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Dec. 21, 2012.
Office Action for U.S. Appl. No. 13/098,490, filed May 2, 2011, dated Mar. 27, 2014.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/312,903, filed Dec. 6, 2011, dated Jun. 13, 2013.
Office Action for U.S. Appl. No. 13/044,301, filed Mar. 9, 2011, dated Jan. 29, 2015.
Office Action for U.S. Appl. No. 13/044,301, dated Mar. 9, 2011.
Office Action for U.S. Appl. No. 13/050,102, filed Mar. 17, 2011, dated Jan. 26, 2015.
Office Action for U.S. Appl. No. 13/087,239, filed Apr. 14, 2011, dated Dec. 5, 2012.
Office Action for U.S. Appl. No. 13/092,460, filed Apr. 22, 2011, dated Mar. 13, 2015.
Office Action for U.S. Appl. No. 13/092,752, filed Apr. 22, 2011, dated Feb. 27, 2015.
Office Action for U.S. Appl. No. 13/092,873, filed Apr. 22, 2011, dated Nov. 29, 2013.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011,.
Office Action for U.S. Appl. No. 13/184,526, filed Jul. 16, 2011, dated Jan. 5, 2015.
Office Action for U.S. Appl. No. 13/184,526, filed Jul. 16, 2011, dated Dec. 2, 2013.
Office Action for U.S. Appl. No. 13/351,513, filed Jan. 17, 2012, dated Feb. 28, 2014.
Office Action for U.S. Appl. No. 13/365,808, filed Jul. 18, 2013, dated Jul. 18, 2013.
Office Action for U.S. Appl. No. 13/425,238, dated Mar. 12, 2015.
Office Action for U.S. Appl. No. 13/533,843, filed Jun. 26, 2012, dated Oct. 21, 2013.
Office Action for U.S. Appl. No. 13/598,204, filed Aug. 29, 2012, dated Jan. 5, 2015.
Office Action for U.S. Appl. No. 13/598,204, filed Aug. 29, 2012, dated Feb. 20, 2014.
Office Action for U.S. Appl. No. 13/669,357, filed Nov. 5, 2012, dated Jan. 30, 2015.
Office Action for U.S. Appl. No. 13/786,328, filed Mar. 5, 2013, dated Mar. 13, 2015.
Office Action for U.S. Appl. No. 13/851,026, filed Mar. 26, 2013, dated Jan. 30, 2015.
Office Action for U.S. Appl. No. 13/092,887, dated Jan. 6, 2014.
Perlman R: 'Challenges and opportunities in the design of TRILL: a routed layer 2 technology', 2009 IEEE Globecom Workshops, Honolulu, HI, USA, Piscataway, NJ, USA, Nov. 30, 2009 (Nov. 30, 2009), pp. 1-6, XP002649647, DOI: 10.1109/GLOBECOM.2009.5360776 ISBN: 1-4244-5626-0 [retrieved on Jul. 19, 2011].
Rosen, E. et al., "BGP/MPLS VPNs", Mar. 1999.
TRILL Working Group Internet-Draft Intended status: Proposed Standard RBridges: Base Protocol Specificaiton Mar. 3, 2010.

(56) References Cited

OTHER PUBLICATIONS

Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office Action for U.S. Appl. No. 13/425,238, filed Mar. 20, 2012, dated Mar. 12, 2015.
Office Action for U.S. Appl. No. 14/577,785, filed Dec. 19, 2014, dated Apr. 13, 2015.
Mahalingam "VXLAN: A Framework for Overlaying Virtualized Layer 2 Networks over Layer 3 Networks" Oct. 17, 2013 pp. 1-22, Sections 1, 4 and 4.1.
Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated May 21, 2015, U.S. Appl. No. 13/288,822, filed Nov. 3, 2011.
Siamak Azodolmolky et al. "Cloud computing networking: Challenges and opportunities for innovations", IEEE Communications Magazine, vol. 51, No. 7, Jul. 1, 2013.
Office action dated Jun. 8, 2015, U.S. Appl. No. 14/178,042, filed Feb. 11, 2014.
Office Action dated Jun. 10, 2015, U.S. Appl. No. 13/890,150, filed May 8, 2013.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
"Network based IP VPN Architecture using Virtual Routers" Paul Knight et al.
Yang Yu et al "A Framework of using OpenFlow to handle transient link failure", TMEE, 2011 International Conference on, IEEE, Dec. 16, 2011.
Office Action for U.S. Appl. No. 14/662,095, dated Mar. 24, 2017.
Office Action for U.S. Appl. No. 15/005,967, dated Mar. 31, 2017.

* cited by examiner

CLIENT AUTO-CONFIGURATION IN A MULTI-SWITCH LINK AGGREGATION

RELATED APPLICATIONS

This application claims the benefit of U.S. Provisional Application No. 61/650,360, titled "Dynamic Detection And Cluster Configuration Of Server And Switch Clients Connected To A Cluster," by inventors Mei Yang, Ravindran Suresh, Arijit Bhattacharyya, and Maocheng Hu, filed 22 May 2012, the disclosure of which is incorporated by reference herein.

The present disclosure is related to U.S. patent application Ser. No. 12/725,249, titled "Redundant Host Connection in a Routed Network," by inventors Somesh Gupta, Anoop Ghanwani, Phanidhar Koganti, and Shunjia Yu, filed 16 Mar. 2010, the disclosure of which is incorporated by reference herein.

BACKGROUND

Field

The present disclosure relates to network management. More specifically, the present disclosure relates to a method and system for facilitating automatic configuration of a multi-switch link aggregation for a respective client device.

Related Art

The exponential growth of the Internet has made it a popular delivery medium for heterogeneous data flows. Such heterogeneity has caused an increasing demand for bandwidth. As a result, equipment vendors race to build larger and faster switches with versatile capabilities, such as link aggregation (LAG), to move more traffic efficiently. However, the complexity of a switch cannot grow infinitely. It is limited by physical space, power consumption, and design complexity, to name a few factors. Furthermore, switches with higher and more versatile capability are usually more complex and expensive.

As more time-critical applications are being implemented in data communication networks, high-availability operation is becoming progressively more important as a value proposition for network architects. It is often desirable to aggregate links to multiple switches to operate as a single logical link (referred to as a multi-switch link aggregation) to facilitate load balancing among the multiple switches while providing redundancy to ensure that a device failure or link failure would not affect the data flow. The switches participating in a multi-switch link aggregation are referred to as partner switches.

A multi-switch link aggregation allows multiple links between a client device, which can be an end host or a switching device, and a plurality of partner switches. Currently, such a multi-switch link aggregation in a network has not been able to take advantage of the automatic configuration of the client device coupled to the partner switches. While coupling the client device, a network administrator typically configures the multi-switch link aggregation manually on a respective client device. In the current era of reduced operational expenditure, such manual configuration can lead to a substantial bottleneck.

While multi-switch link aggregation brings many desirable features to networks, some issues remain unsolved for client device configurations.

SUMMARY

One embodiment of the present invention provides a switch capable of auto-configuration of client devices for a link aggregation. The switch includes a packet processor, an auto-configuration module, and a link-aggregation management module. During operation, the packet processor extracts an identifier of a client device from a notification message received via a local port. The auto-configuration module, which is coupled to the packet processor, associates the local port with the identifier of the client device. If the packet processor recognizes the identifier of the client device in a message received from a remote switch, the link-aggregation management module forms a multi-switch link aggregation for the client device in conjunction with the remote switch.

In a variation on this embodiment, the identifier of the client device is either a media access control (MAC) address of the client device or a hash value of the MAC address.

In a variation on this embodiment, the notification message is based on a discovery protocol. This discovery protocol is one of: Link Layer Discovery Protocol (LLDP), Cisco Discovery Protocol (CDP), and Advanced Device Discovery Protocol (ADDP).

In a variation on this embodiment, the notification message also includes one or more of: name and description of the client device, a port identifier associated with an outgoing port of the client device, a virtual local area network (VLAN) identifier associated with the port or the client device, an Internet Protocol (IP) management address, capabilities associated with the client device, power management information, and link aggregation information.

In a variation on this embodiment, the packet processor extracts the identifier of the client device from a plurality of notification messages received via a plurality of local ports. The link-aggregation management module forms a local link aggregation using the plurality of local ports. The auto-configuration module associates the local link aggregation with the identifier of the client device.

In a variation on this embodiment, the link-aggregation management module represents the multi-switch link aggregation using a virtual switch identifier. This virtual switch identifier is associated with the switch and the remote switch.

In a variation on this embodiment, the packet processor encapsulates a data frame received from the client device in a Transparent Interconnection of Lots of Links (TRILL) packet.

In a variation on this embodiment, the switch also includes a fabric switch management module which maintains a membership in a fabric switch. The fabric switch is configured to accommodate a plurality of switches and operates as a single logical switch.

BRIEF DESCRIPTION OF THE FIGURES

In the figures, like reference numerals refer to the same figure elements.

DETAILED DESCRIPTION

Figure 1A:
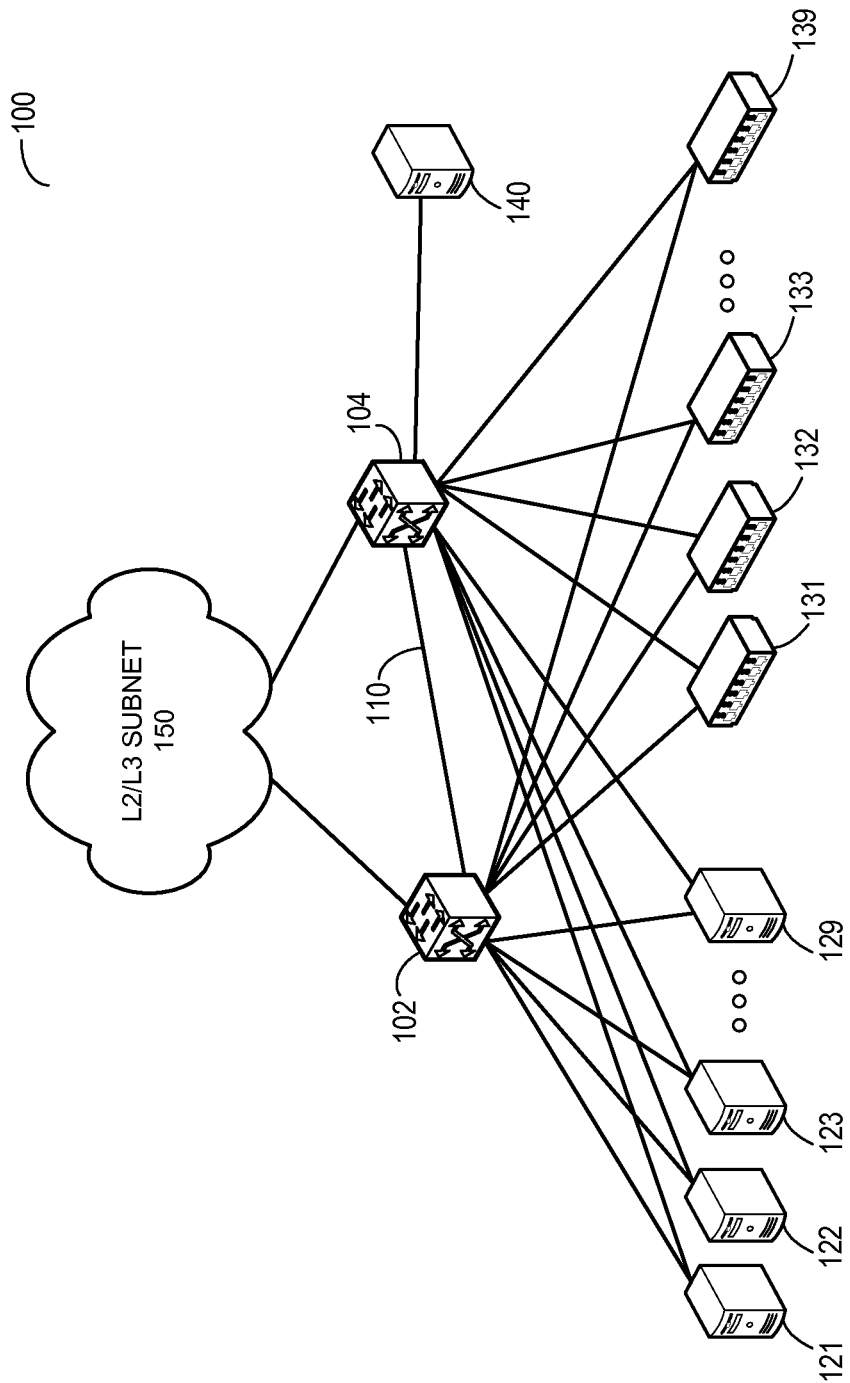
FIG. 1A illustrates an exemplary multi-switch link aggregation with client auto-configuration support, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of facilitating automatic configuration of a multi-switch link aggregation for a client device is solved by sharing client device information via a proactive communication between a client device and a respective partner switch. This allows the partner switch to automatically configure a link aggregation for the client device. It is often desirable to aggregate multiple links between multiple switches and a client device in a network into a logical link aggregation (can also be referred to as a trunk) in a network. Such a link aggregation includes several links among a plurality of switches, and a client device to create a single logical link and support increased bandwidth. This multi-switch link aggregation can also provide high availability. If one of the links or switches in the multi-switch link aggregation fails, the active switch(es) associated with the link aggregation can automatically redistribute traffic across the active links in the link aggregation.

However, with the existing technologies, a multi-switch link aggregation implementation requires manual configuration for a respective client device in a respective partner switch. Such manual configuration typically requires multiple command line interface (CLI) commands for a respective client device. Consequently, a network administrator configuring the multi-switch link aggregation requires the knowledge of the exact number of client devices and the corresponding client device information, such as identification and configuration information. For example, if a multi-switch link aggregation supports 256 client devices, the network administrator needs to know the identification and configuration of 256 client devices. If configuring a client requires "x" number of command line interface commands, the network administrator issues (256*x) commands to a respective partner switch in the multi-switch link aggregation. Such a large volume of manual commands can be repetitious, tedious, and error-prone, and can lead to high operational expenses.

This problem is solved by using proactive communication between a respective client device and the partner switches, typically based on a discovery protocol available in the client devices and partner switches. A respective client device automatically sends the associated information in a notification message via a respective active link of the client device. A respective partner switch receives the notification message via an active link coupling the client device and configures the corresponding multi-switch link aggregation using the received information. Note that the discovery protocol in a respective client device can automatically send out the notification message without any external instruction.

Client device information can include one or more of: a unique identifier (e.g., a media access control (MAC) address) of the client device, name and description of the client device, a port identifier associated with the link, a virtual local area network (VLAN) identifier associated with the port or the client device, an Internet Protocol (IP) management address, capabilities associated with the client device, power management information, and link aggregation information. Examples of a discovery protocol include, but are not limited to, Link Layer Discovery Protocol (LLDP), Cisco Discovery Protocol (CDP), and Advanced Device Discovery Protocol (ADDP).

Upon receiving the client device information, a respective partner switch retrieves the unique identifier of the client device (e.g., the MAC address). The switch identifies the one or more ports from which the notification messages comprising the identifier have been received. In this way, the partner switch recognizes the ports coupling the client device. During the synchronization process with the partner switches, the switch receives the client device information from the remote partner switches. Consequently, the switch recognizes the client device to be multi-homed (i.e., coupled to multiple partner switches). Similarly, a respective remote partner switch receives the client device information from other partner switches and recognizes the client device to be multi-homed. As a result, a respective partner switch then configures a multi-switch link aggregation for the client device across the partner switches.

In some embodiments, the partner switches of a multi-switch link aggregation are member switches of a fabric switch. A client device can be coupled to the fabric switch via the multi-switch link aggregation. A fabric switch in the network can be an Ethernet fabric switch or a virtual cluster switch (VCS). In an Ethernet fabric switch, any number of switches coupled in an arbitrary topology may logically operate as a single switch. Any new switch may join or leave the fabric switch in "plug-and-play" mode without any manual configuration. In some embodiments, a respective switch in the Ethernet fabric switch is a Transparent Interconnection of Lots of Links (TRILL) routing bridge (RBridge). A fabric switch appears as a single logical switch to the end device.

Although the present disclosure is presented using examples based on the use of a discovery protocol, embodiments of the present invention are not limited to the use of a discovery protocol. Embodiments of the present invention are relevant to any method that facilitates automatic information dispersion from a client device for facilitating auto-configuration. In this disclosure, the term "discovery protocol" is used in a generic sense, and can refer to any set of actions that enable a switch to automatically learn information about a client device. Such a set of actions can be implemented in any networking layer, sub-layer, or a combination of networking layers.

The term "client device" refers to any device coupled to a switch via a link aggregation. "Client device" can refer to a host device, which is referred to as a "client host device," or any type of network switching device, which is referred to as a "client switching device." "Client switching device" can refer to any client device that can forward traffic to another device. Additionally, a client device can be coupled to other switches or hosts further away from a network. A client device can also be an aggregation point for a number of network devices to enter the network.

The term "message" refers to a group of bits that can be transported together across a network. "Message" should not be interpreted as limiting embodiments of the present invention to any specific networking layer. "Message" can be replaced by other terminologies referring to a group of bits, such as "frame," "packet," "cell," or "datagram." The term "frame" is used in a generic sense and should not be interpreted as limiting embodiments of the present invention to layer-2 networks. "Frame" can be replaced by other terminologies referring to a group of bits, such as "packet," "cell," or "datagram."

The term "switch" is used in a generic sense, and it can refer to any standalone or fabric switch operating in any network layer. "Switch" should not be interpreted as limiting embodiments of the present invention to layer-2 networks. Any device that can forward traffic to a client device can be referred to as a "switch." Examples of a "switch" include, but are not limited to, a layer-2 switch, a layer-3 router, a Transparent Interconnection of Lots of Links (TRILL) Routing Bridge (RBridge), an FC router, or an FC switch.

The term "Ethernet fabric switch" refers to a number of interconnected physical switches which form a single, scalable logical switch. In a fabric switch, any number of switches can be connected in an arbitrary topology, and the entire group of switches functions together as one single, logical switch. This feature makes it possible to use many smaller, inexpensive switches to construct a large fabric switch, which can be viewed as a single logical switch externally.

Network Architecture

FIG. 1A illustrates an exemplary multi-switch link aggregation with client auto-configuration support, in accordance with an embodiment of the present invention. A network 100 includes switches 102 and 104 coupled to each other via inter-switch link 110. Also included is a layer-2 and/or layer-3 sub-network 150 coupled to switches 102 and 104. In some embodiments, network 100 is a fabric switch. A large number of multi-homed client host devices, from 121 to 129, are coupled to switches 102 and 104. Similarly, a large number of multi-homed client switching devices, from 131 to 139 are coupled to switches 102 and 104. The total number of multi-homed client devices supported by switches 102 and 104 is equal to or greater than the number of client devices coupled to both switches 102 and 104. A switch can also have single-homed client devices coupled to the switch. For example, switch 104 is coupled to single-homed client host device 140.

With the existing technologies, configuring a multi-switch link aggregation for a client device (e.g., client device 121 or 131) requires manual configuration involving multiple command line interface commands on both switches 102 and 104. Furthermore, for issuing the commands, the network administrator of network 100 requires explicit knowledge of client device information, such as identification and configuration of client devices 121-129 and 131-139. A large volume of manual commands can be repetitious, tedious, and error-prone, and can lead to high operational expenses. To solve this problem, client devices 121-129 and 131-139 can proactively convey their respective client device information to switches 102 and 104.

In some embodiments, client devices 121-129 and 131-139 support one or more discovery protocols for automatic information dispersion. A respective client device can use a different discovery protocol, as long as switches 102 and 104 support that discovery protocol. Client device information of client devices 121-129 and 131-139 can include one or more of: a MAC address of the client device, name and description of the client device, a port identifier associated with the active link, a VLAN identifier associated with the port or the client device, an IP management address, capabilities associated with the client device, power management information, and link aggregation information. Examples of a discovery protocol include, but are not limited to, LLDP, CDP, and ADDP.

During operation, switches 102 and 104 are configured as partner switches for multi-switch link aggregations. As a result, all client devices multi-homed to switches 102 and 104 synchronize information with each other. Upon coupling to switch 102, client device 121 sends to switch 102 a notification message, which includes the MAC address of client device 121 and an identifier of the local port coupling switch 102. Switch 102 receives the notification message from client device 121 and retrieves the MAC address of client device 121 from the message. Switch 102 identifies the port from which the notification message has been received and associates the identifier with the port. If switch 102 receives notification messages from client device 121 via a plurality of ports, switch 102 associates these ports with client device 121. In this way, switch 102 recognizes all local ports coupling client device 121. Similarly, client device 121 sends a notification message to switch 104 as well for a respective link coupling client device 121 to switch 104. This allows switch 104 to recognize the local ports coupling client device 121.

Partner switches 102 and 104 synchronize the received information from client device 121 with each other via inter-switch link 110. When switch 102 receives information of client device 121 from partner switch 104, switch 102 checks whether the same client device (e.g., a device with the same MAC address) is locally coupled and discovers that client device 121 is coupled to switch 102 as well. In this way, switch 102 recognizes client device 121 to be multi-homed. Similarly, when switch 104 receives information about client device 121 from switch 102, switch 104 recognizes client device 121 to be multi-homed. Partner switches 102 and 104, in conjunction with each other, configure a multi-switch link aggregation for client device 121 across switches 102 and 104. Similarly, client devices 122-129 and 131-139 send respective client device information to switches 102 and 104. Partner switches 102 and 104 configure a respective multi-switch link aggregation for client devices 122-129 and 131-139 across switches 102 and 104.

Figure 1B:
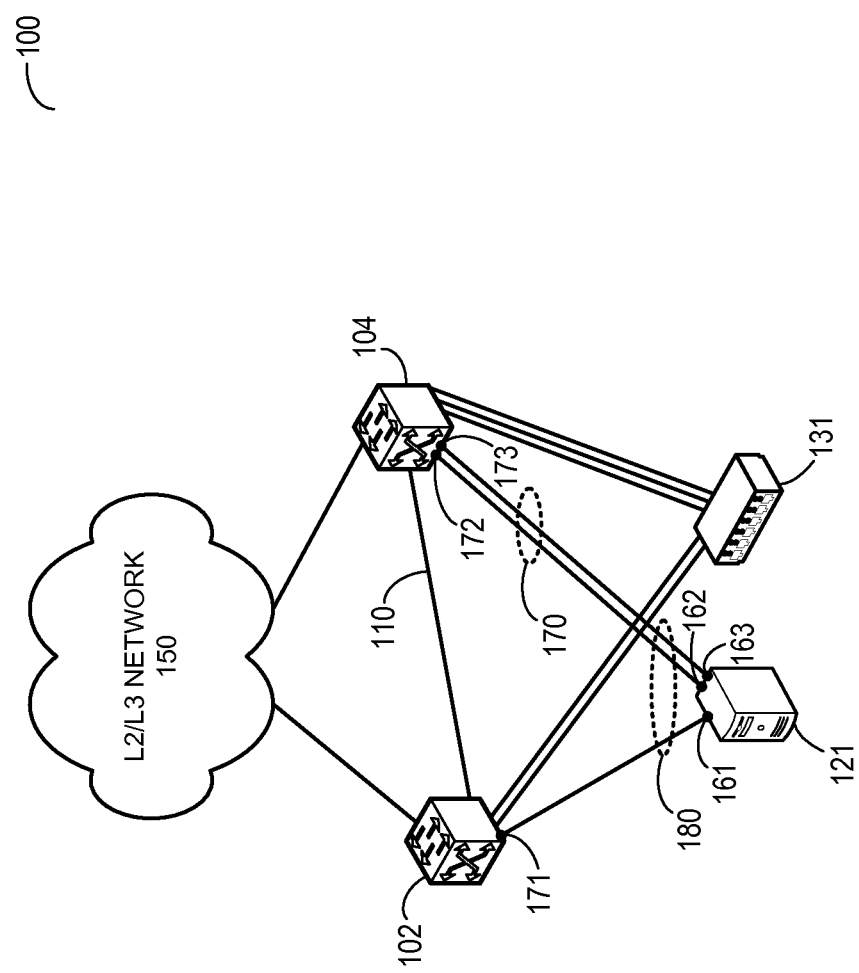
FIG. 1B illustrates how a respective client device uses a discovery protocol for auto-configuration in conjunction with the example in FIG. 1A, in accordance with an embodiment of the present invention.

FIG. 1B illustrates how a respective client device uses a discovery protocol for auto-configuration in conjunction with the example in FIG. 1A, in accordance with an embodiment of the present invention. A respective client device can be coupled to a respective partner switch via any number of links within the maximum number of links supported by the switch and the client device. As a result, a client device can couple with different partner switches via different numbers of links. In the example in FIG. 1B, client device 121 is coupled to switches 102 and 104 via one and two links, respectively. Similarly, client device 131 is coupled to switches 102 and 104 via two and three links, respectively.

When client device 121 sends a notification message to switch 102 via port 161, client device 121 includes the MAC address of client device 121 and an identifier of port 161. Client device 121 can also include the corresponding link capability and a VLAN identifier associated with port 161.

Upon receiving the notification message from client device 121, switch 102 identifies the MAC address of client device 121 and the port identifier of port 161. Switch 102 also identifies port 171 from which switch 102 has received the notification message comprising the MAC address of client device 121. Similarly, when client device 121 sends notification messages to switch 104 via ports 162 and 163, client device 121 includes the MAC address of client device 121 in both notification messages. However, client device 121 includes in the message an identifier of port 162 while sending via port 162 and an identifier of port 163 when sending via port 163. Switch 104 receives the notification messages from client device 121, and identifies the MAC address of client device 121 and the port identifiers of ports 162 and 163. Switch 102 also identifies ports 172 and 173 from which switch 104 has received the notification messages comprising the MAC address of client device 121.

Because switch 104 has received notification messages with the same MAC address (i.e., the MAC address of client device 121) via multiple ports (i.e., ports 172 and 173), switch 104 detects that client device 121 is coupled to switch 104 via multiple links. Switch 104 then forms a local link aggregation 170 comprising ports 172 and 173. In some embodiments, switch 104 sends a notification message to client device 121 regarding the link aggregation. Client device 121 receives the notification message and becomes aware of the link aggregation via ports 162 and 163. In some embodiments, client device 121 and switches 102 and 104 support a dynamic link aggregation protocol. An example of a dynamic link aggregation protocol includes, but is not limited to, Link Aggregation Control Protocol (LACP). A dynamic link aggregation protocol allows client device 121 and switches 102 and 104 to verify local link aggregation 170 and detect any misconfiguration, such as inconsistent link aggregation configuration between ports 172 and 173.

Partner switches 102 and 104 synchronize the received information from client device 121 with each other. When switch 102 receives the MAC address of client device 121 from partner switch 104, switch 102 detects that the MAC address is associated with a locally coupled client device 121 and recognizes client device 121 to be multi-homed. Similarly, switch 104 receives the MAC address of client device 121 from switch 102 and recognizes client device 121 to be multi-homed. Partner switches 102 and 104 then automatically configure multi-switch link aggregation 180 for client device 121 across switches 102 and 104. Switch 102 associates port 171 with multi-switch link aggregation 180 while switch 104 associates local link aggregation 170 with multi-switch link aggregation 180.

Auto-Configuration

Figure 2A:
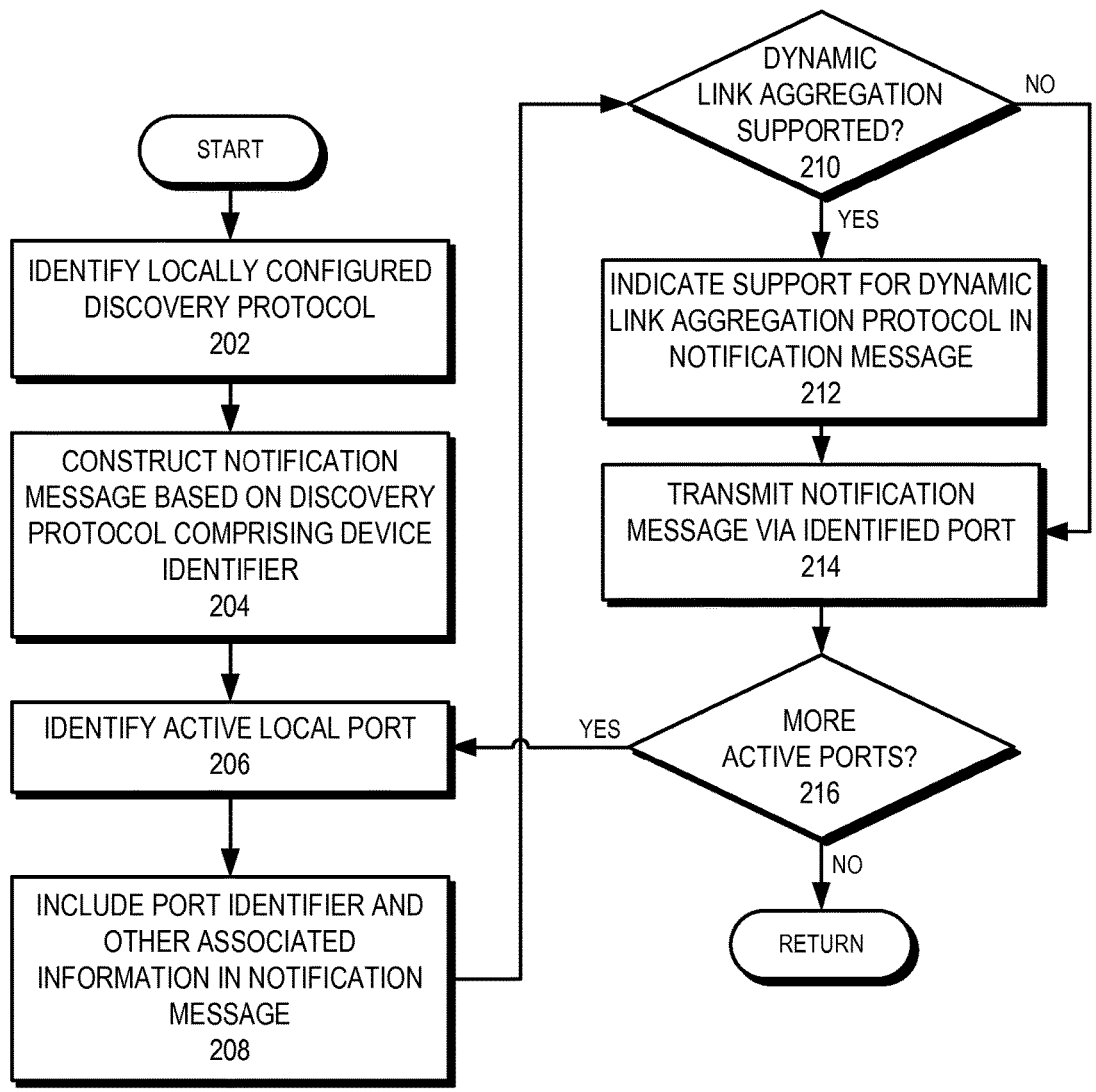
FIG. 2A presents a flowchart illustrating the auto-configuration process of a client device associated with a multi-multi-switch link aggregation, in accordance with an embodiment of the present invention.

In the example in FIG. 1B, switches 102 and 104, and client device 121 facilitate auto-configuration using proactive communication between them. FIG. 2A presents a flowchart illustrating the auto-configuration process of a client device associated with a multi-multi-switch link aggregation, in accordance with an embodiment of the present invention. During the initial powering up (i.e., the booting up), the client device identifies the locally configured discovery protocol (operation 202). The client device constructs a notification message, which is based on the discovery protocol, comprising a device identifier (e.g., a MAC address of the client device) (operation 204). The client device identifies an active local port (i.e., an active link) (operation 206) and includes an identifier to the identified port, and other associated information, such as a VLAN identifier, a link capability, and link aggregation information, in the notification message (operation 208).

Note that the construction of the notification message and inclusion of the client device information can be specified in the discovery protocol. The client device simply implements the discovery protocol to facilitate the auto-configuration.

The client device can check whether the client device supports a dynamic link aggregation protocol (operation 210). In some embodiments, the dynamic link aggregation protocol is LACP. If the client device supports a dynamic link aggregation protocol, the client device indicates the support for the dynamic link aggregation protocol in the notification message (operation 212). In some embodiments, the client device uses a modified notification message of the discovery protocol to indicate the support for the dynamic link aggregation protocol. For example, the client device can use a modified version of an LLDP notification message to indicate the support for LACP. The client device then transmits the notification message via the identified port (operation 214). Next, the client device checks whether the client device has any more active ports (operation 216). If so, the client device continues to identify active ports (operation 206).

Figure 2B:
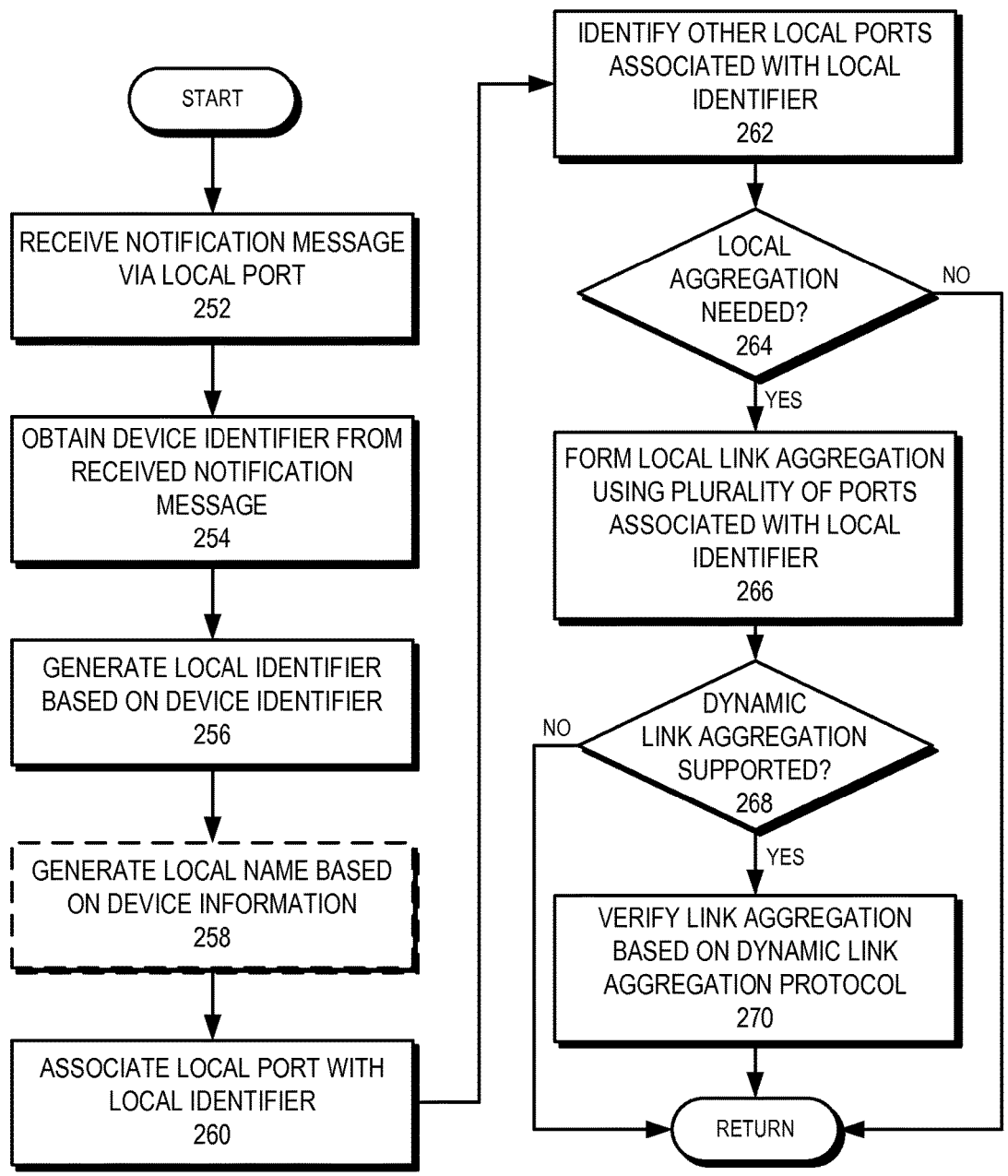
FIG. 2B presents a flowchart illustrating the auto-configuration process of a partner switch associated with a multi-multi-switch link aggregation, in accordance with an embodiment of the present invention.

FIG. 2B presents a flowchart illustrating the auto-configuration process of a partner switch associated with a multi-multi-switch link aggregation, in accordance with an embodiment of the present invention. Upon receiving a notification message via a local port (operation 252), the switch obtains a device identifier of a client device from the received notification message (operation 254). This identifier can be a MAC address of the client device. The switch generates a local identifier, which can be shorter than the received client device identifier, for the client device (operation 256). Such generation of shorter local identifier can reduce memory requirements and have ease of deployment. In some embodiments, the local identifier is a hashed value of the MAC address of the client device. A respective partner switch uses the same hash function. Consequently, the same MAC address generates the same local identifier in a respective partner switch. In the example in FIG. 1B, switches 102 and 104 generate the same local identifier for the MAC address of device 121. The switch can optionally generate a local name for the client device (operation 258). In some embodiments, the local name is created as a combined string of the phrase "Auto," a system name of the client device with a maximum length of 20 characters, and the 12 digits of the base MAC address of the client device.

The switch then associates the local port with the local identifier (operation 260). This allows the switch to identify a respective port from which a notification message from the same client device (i.e., comprising the same identifier) has been received. The switch then identifies other local ports, if any, associated with the local identifier (operation 262) and checks whether a local link aggregation is required (operation 264), as described in conjunction with FIG. 1B. The switch can check the requirement of a local link aggregation by checking whether a plurality of ports are associated with the same local identifier. If a local link aggregation is needed, the switch forms a local link aggregation using the plurality of ports associated with the local identifier (operation 266). In some embodiments, the switch checks whether the switch supports a dynamic link aggregation protocol (operation 268). An example of the dynamic link aggregation protocol is LACP. If the switch supports dynamic link aggregation protocol, the switch verifies the local link aggregation based on the dynamic link aggregation protocol (operation 270) and detects any misconfiguration, such as inconsistent link aggregation configuration.

Multi-Switch Link Aggregation

Figure 3:
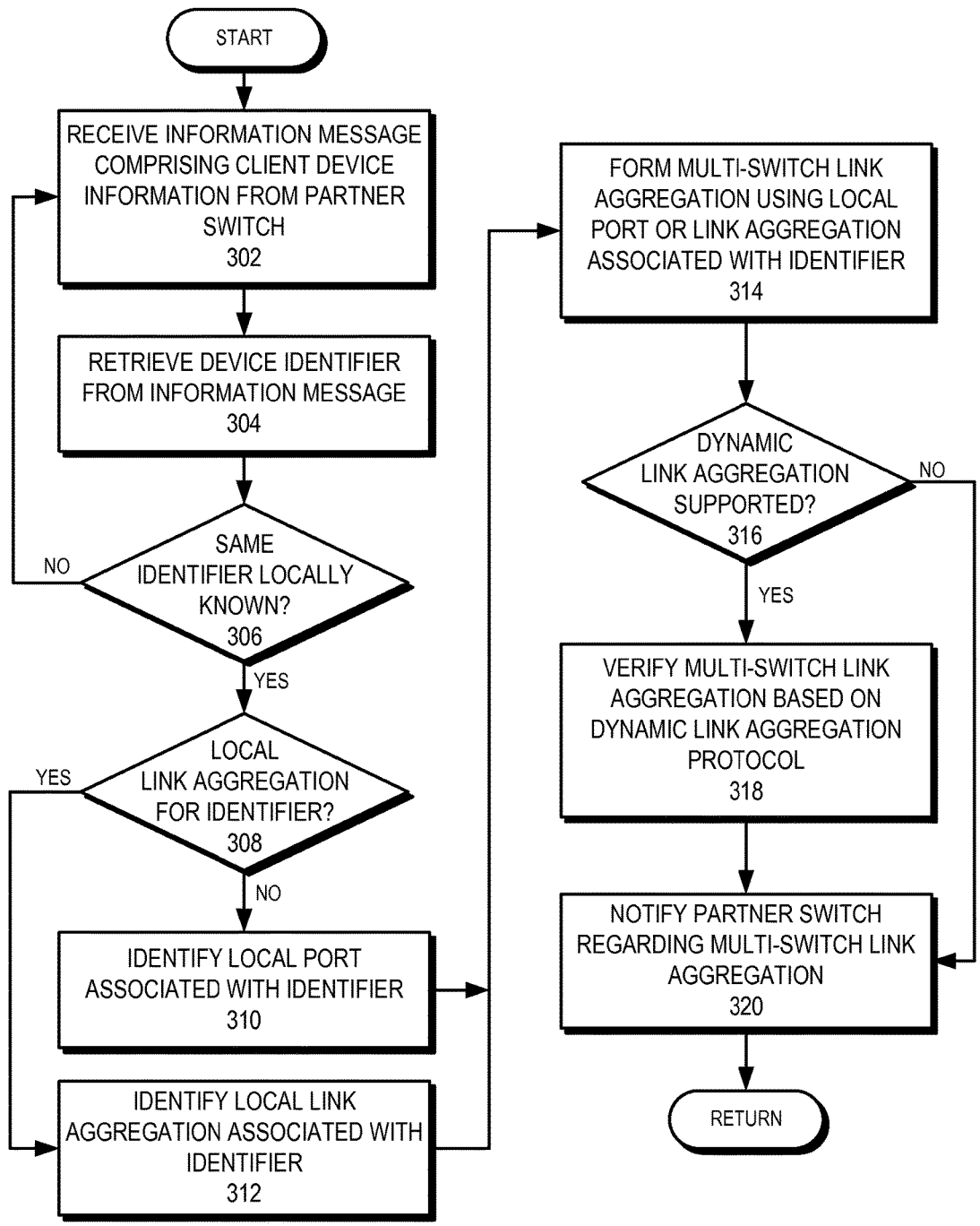
FIG. 3 presents a flowchart illustrating the process of a switch configuring a multi-multi-switch link aggregation based on client auto-configuration, in accordance with an embodiment of the present invention.

In the example in FIG. 1B, after the auto-configuration of device 121, switches 102 and 104, in conjunction with each other, automatically configure a multi-switch link aggregation for client device 121. FIG. 3 presents a flowchart illustrating the process of a switch configuring a multi-multi-switch link aggregation based on client auto-configuration, in accordance with an embodiment of the present invention. The switch can repeat the process described in conjunction with FIG. 3 for a respective partner switch. During operation, the switch receives an information message comprising client device information from a partner switch (operation 302). The switch retrieves the device identifier from the information message (operation 304). This device identifier can be the MAC address of the client device or a locally generated hashed value of the MAC address. Next, the switch checks whether the same identifier is locally known (i.e., associated with a local port) (operation 306). If not, the corresponding client device is not multi-homed and not a candidate for a multi-switch link aggregation. The switch then continues to receive information message from the partner switch (operation 302).

If the same identifier exists locally, the corresponding client device is multi-homed. The switch then checks whether the switch has a local link aggregation for the identifier (i.e., a local link aggregation is associated with the identifier) (operation 308). If the switch does not have a local link aggregation for the identifier, the switch identifies the local port associated with the identifier (operation 310). Otherwise, the switch identifies the link aggregation associated with the identifier (operation 312). After identifying the local port or link aggregation, the switch forms a multi-switch link aggregation using the local port or link aggregation associated with the identifier (operation 314). In some embodiments, the switch can check whether the client device supports a dynamic link aggregation protocol (operation 316), such as LACP.

If the end device supports a dynamic link aggregation protocol, the switch verifies the multi-switch link aggregation based on the dynamic link aggregation protocol (operation 318) and detects any misconfiguration, such as inconsistent link aggregation configuration. If the end device does not support a dynamic link aggregation protocol (operation 316) or has verified the multi-switch link aggregation (operation 318), the switch notifies the partner switch regarding the multi-switch link aggregation (operation 320). Consequently, the partner switches become aware of each others' multi-switch link aggregation configuration. In some embodiments, the switch, in conjunction with the partner switch, can create a virtual switch representing the multi-switch link aggregation. Switch virtualization and its associated operations, such as data synchronization, are specified in U.S. Patent Publication No. 2010/0246388, titled "Redundant Host Connection in a Routed Network," the disclosure of which is incorporated herein in its entirety.

Exemplary Switch

Figure 4:
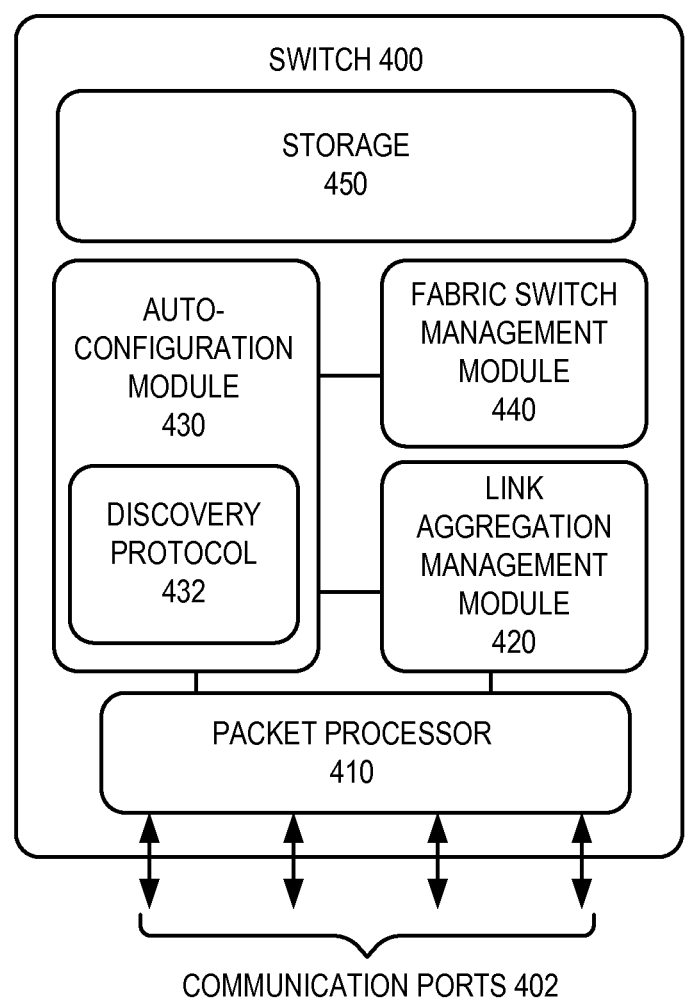
FIG. 4 illustrates an exemplary switch in a software-defined network, in accordance with an embodiment of the present invention.

FIG. 4 illustrates an exemplary switch in a software-defined network, in accordance with an embodiment of the present invention. In this example, a switch 400 includes a number of communication ports 402, a link aggregation management module 420, an auto-configuration module 430, a packet processor 410 coupled to auto-configuration module 430, and a storage 450. In some embodiments, switch 400 may maintain a membership in a fabric switch, wherein switch 400 also includes a fabric switch management module 440. Fabric switch management module 440 maintains a configuration database in storage 450 that maintains the configuration state of a respective switch within the fabric switch. Fabric switch management module 440 maintains the state of the fabric switch, which is used to join other switches. Under such a scenario, communication ports 402 can include inter-switch communication channels for communication within a fabric switch. This inter-switch communication channel can be implemented via a regular communication port and based on any open or proprietary format.

During operation, packet processor 410 extracts an identifier of a client device from a notification message received via a local port, which is one of the communication ports 402. This identifier of the client device can be the MAC address of the client device or a hash value of the MAC address, as described in conjunction with FIG. 2B. In some embodiments, the notification message is based on a discovery protocol 432. Discovery protocol 432 enables switch 400 to recognize the notification message sent by the client device. The notification message can also include one or more of: name and description of the client device, a port identifier, a VLAN identifier associated with the port or the client device, an IP management address, capabilities associated with the client device, power management information, and link aggregation information. Examples of discovery protocol 432 include, but are not limited to, LLDP, CDP, and ADDP.

Auto-configuration module 430 then associates the local port with the identifier of the client device. If packet processor 410 recognizes the identifier of the client device in a message received from a remote switch, link-aggregation management module 420 forms a multi-switch link aggregation for the client device in conjunction with the remote switch. If the client device is coupled to switch 400 via multiple links, packet processor 410 can extract the identifier of the client device from a plurality of notification messages received via the corresponding local ports. Under such a scenario, link-aggregation management module 420 forms a local link-aggregation using the plurality of local ports. Auto-configuration module 430 associates the local link aggregation with the identifier of the client device.

In some embodiments, link-aggregation management module 420 represents the multi-switch link aggregation using a virtual switch identifier. This virtual switch identifier is associated with the switch and the remote switch. In some embodiments, switch 400 is a TRILL RBridge. Under such a scenario, the virtual switch identifier can be a virtual RBridge identifier. Furthermore, packet processor 410 encapsulates a respective data frame received from the client device in a TRILL packet to send the data packet to another RBridge.

Note that the above-mentioned modules can be implemented in hardware as well as in software. In one embodiment, these modules can be embodied in computer-executable instructions stored in a memory which is coupled to one or more processors in switch 400. When executed, these instructions cause the processor(s) to perform the aforementioned functions.

In summary, embodiments of the present invention provide a switch and a method for facilitating automatic configuration of a client device for a multi-switch link aggregation. In one embodiment, the switch includes a packet processor, an auto-configuration module, and a link aggregation management module. During operation, the packet processor extracts an identifier of a client device from a notification message received via a local port. The auto-configuration module, which is coupled to the packet processor, associates the local port with the identifier of the client device. If the packet processor recognizes the identifier of the client device in a message received from a remote switch, the link-aggregation management module forms a multi-switch link aggregation for the client device in conjunction with the remote switch.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
one or more ports;
processing circuitry configured to obtain, from a first message from a client device, a device identifier of the client device, a port identifier of a port of the client device, and an indicator, which is distinct from the device identifier and indicates indicating whether the client device supports dynamic link aggregation; and
management circuitry configured to:
obtain, from a second message from a remote switch, the device identifier, wherein the switch and the remote switch are in a plug-and-play mode for forming a logical switch;
determine that the client device is multi-homed with the switch and the remote switch; and
determine whether the client device supports dynamic link aggregation based on the indicator;
in response to the indicator indicating that the client device supports dynamic link aggregation:
dynamically form a multi-switch link aggregation for the client device;
verify the multi-switch link aggregation based on a dynamic link aggregation protocol for detecting any misconfiguration; and
in response to detecting a misconfiguration, generate a notification message for the remote switch regarding the misconfiguration;
in response to the indicator indicating that the client device does not support dynamic link aggregation, generate a notification message for the remote switch regarding the multi-switch link aggregation.

2. The switch of claim 1, wherein the device identifier of the client device is one of: a media access control (MAC) address of the client device and a hash value of the MAC address.

3. The switch of claim 1, wherein the first message is based on a discovery protocol; and
wherein the discovery protocol is one of:
Link Layer Discovery Protocol (LLDP);
Cisco Discovery Protocol (CDP); and
Advanced Device Discovery Protocol (ADDP).

4. The switch of claim 1, wherein the first message further comprises one or more of:
name and description of the client device;
a virtual local area network (VLAN) identifier associated with the port of the client device;
an Internet Protocol (IP) management address;
capabilities associated with the client device;
power management information; and
link aggregation information.

5. The switch of claim 1, wherein the first message received is via a first port of the one or more ports of the switch;
wherein the processing circuitry is further configured to obtain the device identifier of the client device from a third message received via a second port of the one or more ports of the switch; and
wherein the management circuitry is further configured to form a local link aggregation for the client device using the first and second ports, wherein the local link aggregation is incorporated in the multi-switch link aggregation.

6. The switch of claim 1, wherein the multi-switch link aggregation is represented by a virtual switch reachable from the switch and the remote switch, and wherein the virtual switch is identified by a virtual switch identifier associated with the switch and the remote switch.

7. The switch of claim 6, wherein the packet processing circuitry is further configured to encapsulate, with an encapsulation header, a data frame received via the multi-switch link aggregation from the client device, wherein the virtual switch identifier is an ingress identifier of the encapsulation header.

8. The switch of claim 1, wherein the switch and the remote switch are members of a network of interconnected switches, wherein the network of interconnected switches is identified by a fabric identifier associated with the switch and the remote switch.

9. A method, comprising:
obtaining, from a first message from a client device, a device identifier of the client device, a port identifier of a port of the client device, and an indicator, which is distinct from the device identifier and indicates whether the client device supports dynamic link aggregation;
obtain, from a second message from a remote switch, the device identifier;
determining that the client device is multi-homed with a local switch and the remote switch, wherein the switch and the remote switch are in a plug-and-play mode for forming a logical switch;
determining whether the client device supports dynamic link aggregation based on the indicator;
in response to the indicator indicating that the client device supports dynamic link aggregation;
forming a multi-switch link aggregation for the client device;
verify the multi-switch link aggregation based on a dynamic link aggregation protocol for detecting any misconfiguration; and
in response to detecting a misconfiguration, generate a notification message for the remote switch regarding the misconfiguration;

in response to the indicator indicating that the client device does not support dynamic link aggregation, generate a notification message for the remote switch regarding the multi-switch link aggregation.

10. The method of claim 9, wherein the device identifier of the client device is one of: a media access control (MAC) address of the client device and a hash value of the MAC address.

11. The method of claim 9, wherein the first message is based on a discovery protocol; and
wherein the discovery protocol is one of:
Link Layer Discovery Protocol (LLDP);
Cisco Discovery Protocol (CDP); and
Advanced Device Discovery Protocol (ADDP).

12. The method of claim 9, wherein the first message further comprises one or more of:
name and description of the client device;
a virtual local area network (VLAN) identifier associated with the port of the client device;
an Internet Protocol (IP) management address;
capabilities associated with the client device;
power management information; and
link aggregation information.

13. The method of claim 9, wherein the first message received is via a first port of the local switch; and
wherein the method further comprises:
obtaining the device identifier of the client device from a third message received via a second port of the local switch; and
forming a local link aggregation for the client device using the first and second ports, wherein the local link aggregation is incorporated in the multi-switch link aggregation.

14. The method of claim 9, wherein the multi-switch link aggregation is represented by a virtual switch reachable from the local switch and the remote switch, and wherein the virtual switch is identified by a virtual switch identifier associated with the local switch and the remote switch.

15. The method of claim 14, further comprising encapsulating, with an encapsulation header, a data frame received via the multi-switch link aggregation from the client device, wherein the virtual switch identifier is an ingress identifier of the encapsulation header.

16. The method of claim 9, wherein the local switch and the remote switch are members of a network of interconnected switches, wherein the network of interconnected switches is identified by a fabric identifier associated with the local switch and the remote switch.

17. A computing system, comprising:
one or more ports;
a processor; and
a non-transitory memory storing instructions that when executed by the processor cause the computing system to perform a method, the method comprising:
obtaining, from a first message from a client device, a device identifier of the client device from a first message from the client device, a port identifier of a port of the client device, and an indicator, which is distinct from the device identifier and indicates whether the client device supports dynamic link aggregation;
obtaining, from a second message from a remote computing system, the device identifier, wherein the computing system and the remote computing system are in a plug-and-play mode for forming a logical switch;
determining that the client device is multi-homed with the computing system and the remote computing system; and
determine whether the client device supports dynamic link aggregation based on the indicator;
in response to the indicator indicating that the client device supports dynamic link aggregation;
forming a multi-switch link aggregation for the client device;
verify the multi-switch link aggregation based on a dynamic link aggregation protocol for detecting any misconfiguration; and
in response to detecting a misconfiguration, generate a notification message for the remote switch regarding the misconfiguration;
in response to the indicator indicating that the client device does not support dynamic link aggregation, generate a notification message for the remote switch regarding the multi-switch link aggregation.

18. The computing system of claim 17, wherein the device identifier of the client device is one of: a media access control (MAC) address of the client device and a hash value of the MAC address.

19. The computing system of claim 17, wherein the first message is based on a discovery protocol; and
wherein the discovery protocol is one of:
Link Layer Discovery Protocol (LLDP);
Cisco Discovery Protocol (CDP); and
Advanced Device Discovery Protocol (ADDP).

20. The computing system of claim 17, wherein the first message further comprises one or more of:
name and description of the client device;
a virtual local area network (VLAN) identifier associated with the port of the client device;
an Internet Protocol (IP) management address;
capabilities associated with the client device;
power management information; and link aggregation information.

21. The computing system of claim 17, wherein the first message received is via a first port of the one or more ports of the computing system; and
wherein the method further comprises:
obtaining the device identifier of the client device from a third message received via a second port of the one or more ports of the computing system;
forming a local link aggregation for the client device using the first and second ports, wherein the local link aggregation is incorporated in the multi-switch link aggregation.

22. The computing system of claim 17, wherein the multi-switch link aggregation is represented by a virtual switch reachable via the computing system and the remote computing system, and wherein the virtual switch is identified by a virtual switch identifier associated with the computing system and the remote computing system.

23. The computing system of claim 22, wherein the method further comprises encapsulating, with an encapsulation header, a data frame received via the multi-switch link aggregation from the client device, wherein the virtual switch identifier is an ingress identifier of the encapsulation header.

24. The computing system of claim 17, wherein the method further comprises maintaining a membership in a network of interconnected switches, wherein the network of interconnected switches is identified by a fabric identifier associated with the computing system and the remote computing system.

* * * * *